(12) United States Patent
Ha et al.

(10) Patent No.: US 10,250,616 B2
(45) Date of Patent: Apr. 2, 2019

(54) SERVER AND USER TERMINAL

(71) Applicant: SAMSUNG ELECTRONICS CO., LTD., Suwon-si, Gyeonggi-do (KR)

(72) Inventors: Seung-hyun Ha, Seoul (KR); Dong-uk Kim, Suwon-si (KR); Jin-mok Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 219 days.

(21) Appl. No.: 15/233,120

(22) Filed: Aug. 10, 2016

(65) Prior Publication Data

US 2017/0085578 A1 Mar. 23, 2017

(30) Foreign Application Priority Data

Sep. 18, 2015 (KR) .................. 10-2015-0132583

(51) Int. Cl.
*G06F 15/16* (2006.01)
*H04L 29/06* (2006.01)
(Continued)

(52) U.S. Cl.
CPC .......... *H04L 63/1408* (2013.01); *G06F 21/50* (2013.01); *G06F 21/57* (2013.01);
(Continued)

(58) Field of Classification Search
CPC ........ G06F 21/50; G06F 21/57; G06F 21/575; G06F 21/72; G06F 21/74; H04L 63/0876;
(Continued)

(56) References Cited

U.S. PATENT DOCUMENTS 7,657,756 B2 * 2/2010 Hall .................... G06F 12/0875
    711/100
8,255,977 B2 8/2012 Xiao et al.
(Continued)

FOREIGN PATENT DOCUMENTS

KR  10-2008-0066126  7/2008
KR  10-2014-0081912  7/2014
(Continued)

OTHER PUBLICATIONS

Search Report and Written Opinion dated Nov. 29, 2016 in counterpart International Patent Application No. PCT/KR2016/008693.
(Continued)

*Primary Examiner* — Moustafa M Meky
*Assistant Examiner* — Thorne E Waugh
(74) *Attorney, Agent, or Firm* — Nixon & Vanderhye P.C.

(57) ABSTRACT

A server includes communication circuitry configured to communicate with a plurality of external terminals, a storage which stores reference data for hardware integrity verification of the plurality of external terminals, and a processor configured to verify the hardware integrity of a second external terminal using the reference data, when a request for the hardware integrity verification of the second external terminal is received through the communication circuitry from a first external terminal.

18 Claims, 15 Drawing Sheets

(51) Int. Cl.
*H04L 29/08* (2006.01)
*H04W 4/70* (2018.01)
*G06F 21/50* (2013.01)
*G06F 21/57* (2013.01)
*G06F 21/72* (2013.01)
*G06F 21/74* (2013.01)
*H04L 9/32* (2006.01)
*H04W 12/10* (2009.01)

(52) U.S. Cl.
CPC ............ *G06F 21/575* (2013.01); *G06F 21/72* (2013.01); *G06F 21/74* (2013.01); *H04L 9/3234* (2013.01); *H04L 63/0876* (2013.01); *H04L 63/10* (2013.01); *H04L 67/12* (2013.01); *H04W 4/70* (2018.02); *H04W 12/10* (2013.01)

(58) Field of Classification Search
CPC ..... H04L 63/10; H04L 63/1408; H04L 67/12; H04L 9/3234; H04W 12/10; H04W 4/70
See application file for complete search history.

(56) References Cited

U.S. PATENT DOCUMENTS

| | | | |
|---|---|---|---|
| 8,316,237 B1* | 11/2012 | Felsher | H04L 9/0825 380/282 |
| 8,458,462 B1* | 6/2013 | Hanna | H04L 63/10 713/156 |
| 8,677,115 B2 | 3/2014 | Paris et al. | |
| 8,984,113 B2 | 3/2015 | Li et al. | |
| 9,882,877 B2* | 1/2018 | Wood | H04L 63/0227 |
| 2012/0047551 A1 | 2/2012 | Pattar et al. | |
| 2012/0102546 A1 | 4/2012 | Jiang et al. | |
| 2012/0151206 A1* | 6/2012 | Paris | H04L 9/3234 713/155 |
| 2013/0046983 A1 | 2/2013 | Zhu et al. | |
| 2014/0129815 A9 | 5/2014 | Shah et al. | |
| 2014/0150096 A1 | 5/2014 | Moon et al. | |
| 2014/0244833 A1 | 8/2014 | Sharma et al. | |
| 2015/0130957 A1 | 5/2015 | Berelejis et al. | |
| 2015/0229654 A1 | 8/2015 | Perier | |
| 2015/0237071 A1* | 8/2015 | Maher | H04L 63/20 726/1 |
| 2015/0237502 A1 | 8/2015 | Schmidt et al. | |
| 2016/0047855 A1* | 2/2016 | Bhunia | G01B 31/31858 324/763.01 |
| 2016/0352685 A1* | 12/2016 | Park | H04L 63/0245 |

FOREIGN PATENT DOCUMENTS

| | | |
|---|---|---|
| KR | 10-2014-0109080 | 9/2014 |
| KR | 10-2014-0114475 | 9/2014 |
| KR | 20160121775 A * | 10/2016 |
| WO | 2014-182665 | 11/2014 |

OTHER PUBLICATIONS

Extended European Search Report dated Apr. 16, 2018 for EP Application No. 16846749.6.

* cited by examiner

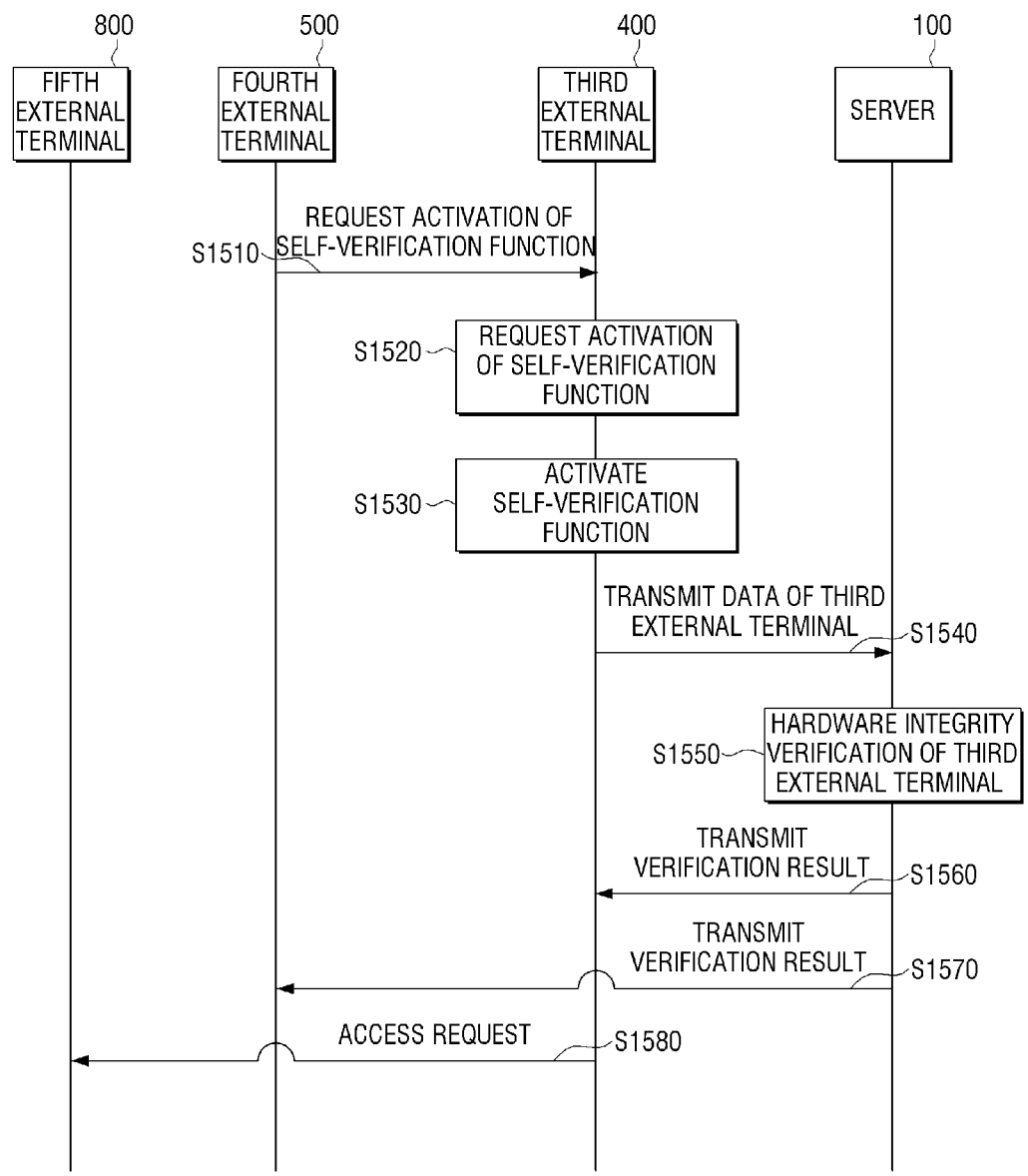

SERVER AND USER TERMINAL

CROSS-REFERENCE TO RELATED APPLICATION

This application is based on and claims priority under 35 U.S.C. § 119 to Korean Patent Application No. 10-2015-0132583, filed on Sep. 18, 2015 in the Korean Intellectual Property Office, the disclosure of which is incorporated by reference herein in its entirety.

BACKGROUND

1. Field

Terminals and servers disclosed herein relate generally to a user terminal and a server, and for example, to a server configured to verify the integrity of a terminal in a network environment including a plurality of terminals, and a user terminal.

2. Description of Related Art

Electronic technology has developed, and numerous network environments such as home network or Internet of Things (IoT), and so on have become available. Specifically, IoT refers to technology to embed a variety of things with sensors and communication functions and connect to the Internet. Herein, things may be various embedded systems such as home appliances, mobile devices, wearable computers, and so on. Things connected to IoT should be connected to the Internet by having the unique IP address that can be distinguished from the others, and may include the sensors to acquire data from the external environment.

IoT environment should provide the security as one of the important considerations because all the things may be a target to be hacked. Regarding the above security issue, the related technology usually discusses a method for verifying the integrity of the software in the terminal by confirming the identity of the terminal through Device to Device authorization or verifying main files such as applications or binary files of the operating system (OS) loaded on the terminal.

In this case, when the software of a specific terminal is hacked at the IoT environment, the terminal connected to the hacked terminal can confirm the same. Further, even when another terminal is connected to the hacked terminal and damaged by the virus, the terminal can be restored by formatting the hard disc or re-installing the OS.

However, when a third party attacks by abusing the hardware bugs of the specific terminal or manipulating the firmware, the above method for simply verifying the integrity of the software may be difficult to sense. Further, the defects in the hardware or the firmware regarding the terminal be difficult to restore by formatting the hardware or re-installing OS after being damaged. Thus, a new technology for verifying the hardware integrity of the terminal at the network environment such as IoT, is needed.

SUMMARY

Example embodiments of the disclosure address the above disadvantages.

According to an example embodiment, a server which can verify the hardware integrity of a terminal at a network environment including a plurality of terminals, and a user terminal is provided.

According to an example embodiment, a server is provided, which may include a communicator (e.g., communication circuitry) configured to communicate with a plurality of external terminals, a storage (e.g., a memory) configured to store reference data for a hardware integrity verification of the plurality of external terminals, and a processor configured to verify the hardware integrity of a second external terminal using the reference data, when a request for the hardware integrity verification of the second external terminal is received from a first external terminal through the communicator (e.g., communication circuitry).

When the request for the hardware integrity verification is received, the processor may be configured to request, from the second external terminal, through the communicator, transmission of data for hardware integrity verification. When a memory-related data of the second external terminal is received from the second external terminal in response to the request for data transmission, the processor may be configured to verify the hardware integrity of the second external terminal by comparing the received memory related data with the reference data of the second external terminal stored in the storage, and to control the communicator to transmit a result of the verification to at least one external terminal among the first and the second external terminals.

The plurality of external terminals include, for example, at least one of a ROM, RAM, flash memory and non-volatile RAM (NVRAM), and the reference data may, for example, be data for integrity verification of at least one of a BIOS, boot loader and firmware stored in the ROM, read only (RO) areas of the RAM, chip ID, flash translation layer (FTL) version and operating system (OS) images in the flash memory, and start up configuration of the non-volatile RAM (NVRAM).

The stored reference data and the memory-related data received from the second external terminal may include hash data.

When the received memory-related data at least partially does not match the stored reference data of the second external terminal, the processor may be configured to generate a warning message including information regarding a non-matching part, and to control the communicator to transmit the generated warning message to at least one external terminal among the first and the second external terminals.

The plurality of external terminals may be terminals connected in an Internet of Things (IoT) environment.

The reference data may be previously provided from a manufacturer of the external terminal or from the external terminal when the external terminal is installed.

When the communicator receives a request for hardware integrity verification of a third external terminal from the third external terminal activated with a hardware integrity self-verification function, the processor may be configured to verify the hardware integrity of the third external terminal using the reference data and to control the communicator to transmit a verification result to the third external terminal.

When the self-verification function of the third external terminal is activated by a fourth external terminal connected to the third external terminal, the processor may be configured to control the communicator to transmit the verification result to the fourth external terminal.

According to an example embodiment, a user terminal is provided, the user terminal may include an inputter (e.g., input circuitry) configured to receive a user command, a communicator (e.g., communication circuitry) configured to communicate with a server and at least one of a plurality of external terminals, a memory configured to store data, and a processor configured to receive a request for transmission of data for hardware integrity verification of the user terminal from the server, when a user command for accessing a first external terminal among the plurality of external terminals is input, and to control the communicator to transmit memory-related data of the memory to the server in response to the request for transmission.

The memory may include at least one of a read-only memory (ROM), a random-access memory (RAM), a flash memory, or a non-volatile RAM (NVRAM), and the memory-related data may include data about at least one among a BIOS, boot loader and firmware stored in a ROM, read only (RO) areas of the RAM, chip ID, flash translation layer (FTL) version and operating system (OS) images of a flash memory, and start up configuration of the NVRAM.

In response to the request for transmission, the processor may be configured to generate a hash of data of the memory-related data, and to control the communicator to transmit the generated hash data.

When accessing the user terminal is requested from a second external terminal among the plurality of external terminals, the processor may be configured to control the communicator to transmit a request for the hardware integrity verification of the second external terminal to the server, and when a hardware integrity verification result of the second external terminal is received from the server, may be configured to determine whether or not to approve the request for accessing of the second external terminal based on the verification result.

The processor may reject the access request of the second external terminal when receiving the verification result that the hardware integrity of the second external terminal has a problem, and may be configured to control the communicator to transmit a message that the hardware integrity of the second external terminal has a problem, to a third external terminal among the plurality of external terminals.

The user terminal may additionally include a display configured to display the plurality of external terminals, and a hardware integrity verification state regarding the plurality of external terminals. In response to receiving of a command for the hardware integrity verification of at least one external terminal among the plurality of displayed external terminals, the processor may be configured to control the communicator to transmit to the server a request for the hardware integrity verification of the external terminal to which the verification command is input, and in response to receiving from the server the hardware integrity verification result of the external terminal to which the verification command is input, may be configured to control the display to update the verification result to the displayed hardware integrity verification state.

The user terminal may additionally include a display configured to distinguish and display the external terminals provided with a hardware integrity self-verification function from other external terminals. In response to receiving a command for activating the hardware integrity self-verification function of at least one external terminal among the displayed external terminals provided with the self-verification function, the processor may be configured to control the communicator to transmit a request for activating the self-verification function to the external terminal to which the activating command is input.

When the hardware integrity self-verification function of the user terminal is activated and when a command for accessing the first external terminal is input, the processor may be configured to control the communicator to transmit the memory-related data to the server, to receive the hardware integrity verification result of the user terminal, and to request access to the first external terminal.

The user terminal and the plurality of external terminals may be terminals connected in an IoT environment.

According to an example embodiment, a non-transitory computer readable recording medium may have recorded thereon a program which, when executed by a suitable processor, may implement a controlling method of a server for hardware integrity verification of a plurality of external terminals making up the network, in which the controlling method may include storing reference data for hardware integrity verification of the plurality of external terminals, receiving a request for the hardware integrity verification of a second external terminal from a first external terminal of the plurality of external terminals, and performing the hardware integrity verification of the second external terminal using the reference data.

According to an example embodiment, a non-transitory computer readable recording medium may have recorded thereon a program which, when executed by a suitable processor, may implement a method for verifying hardware integrity of a user terminal, in which the verifying method may include inputting a command for accessing an external terminal, receiving from a server a request for transmission of data for the hardware integrity verification, and transmitting memory-related data of a memory included in the user terminal to the server in response to the request for transmission.

According to the various example embodiments, the hardware integrity of the terminal can be verified at the network environment including a plurality of terminals. Thus, a more secure network environment may be realized in defense against hacking of a third party.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIGS. 14 and 15 are sequence diagrams illustrating example operation of a system for verifying hardware integrity.

DETAILED DESCRIPTION

Figure 1:
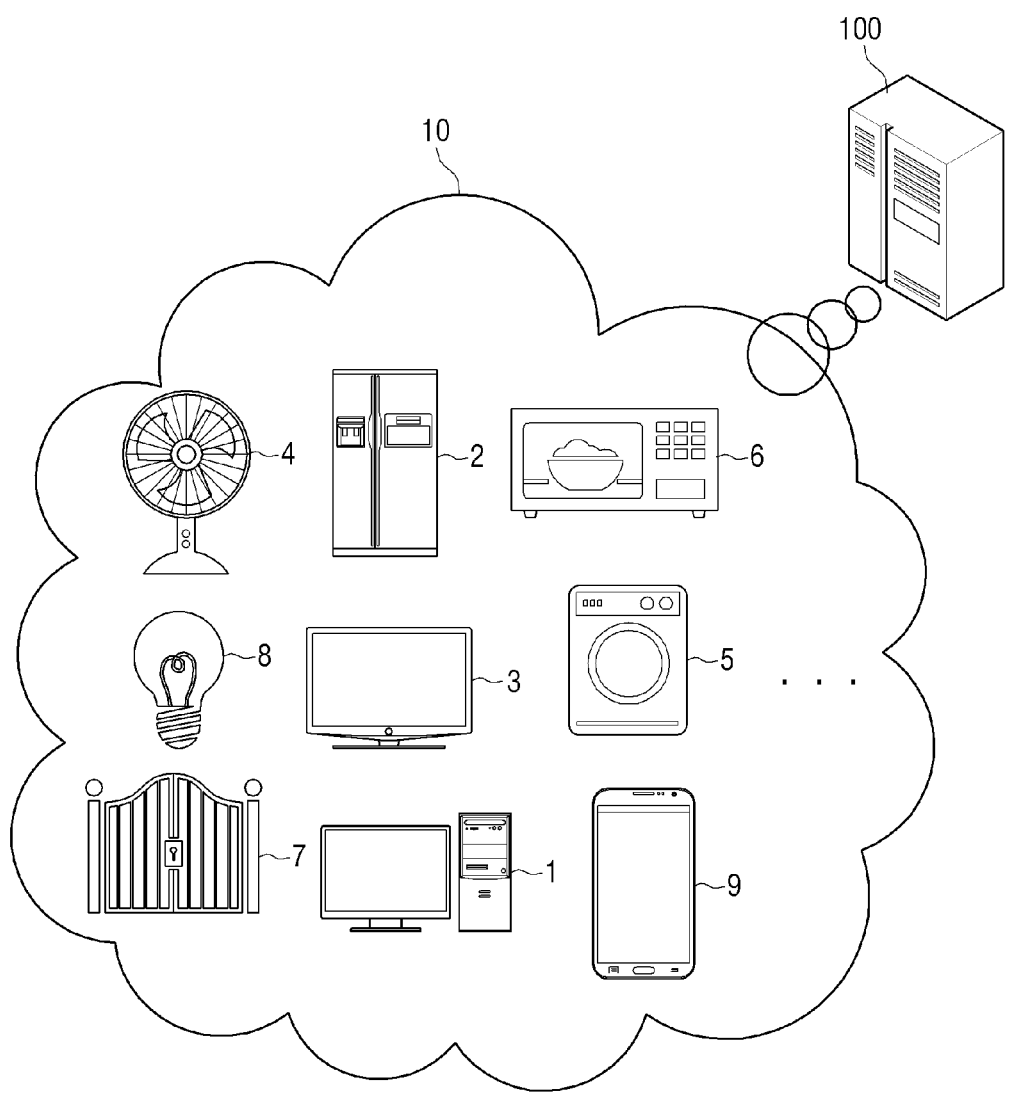
FIG. 1 is a diagram illustrating an example system for verifying hardware integrity.

Certain example embodiments of the disclosure will be described in greater detail below with reference to the accompanying drawings.

The example embodiments of the disclosure may be diversely modified. Accordingly, example embodiments are illustrated in the drawings and are described in greater detail in the detailed description. However, it is to be understood that the disclosure is not limited to any specific example embodiment, but includes all modifications, equivalents, and substitutions without departing from the scope and spirit of the disclosure. Also, well-known functions or constructions may not described in detail since they may obscure the disclosure with unnecessary detail.

The terms used in the disclosure are used to describe the example embodiments, but are not intended to limit the scope of the disclosure. The singular expression also includes the plural meaning as long as it does not conflict in context. In the disclosure, the terms "include" and "consist of" designate the presence of features, numbers, steps, operations, components, elements, or a combination thereof that are written in the disclosure, but do not exclude the presence or possibility of addition of one or more other features, numbers, steps, operations, components, elements, or a combination thereof.

In describing the example embodiments, well-known functions or constructions may not described in detail since they may obscure the disclosure with unnecessary detail. Certain suffixes such as "portion", "unit", "-er (or)" and so on are provided in consideration of ease of drafting the description, and do not carry any meanings or roles of distinguishing one from another. Further, the numbers (e.g., first, second, and so on) as used herein are merely the identifying symbols to distinguish one element from another.

Referring to the drawings, the various example embodiments will be described in greater detail below. FIG. 1 is a diagram illustrating an example system for verifying the hardware integrity. Referring to FIG. 1, the example hardware integrity verifying system includes a server 100 and a plurality of external terminals 1 to 9. The plurality of external terminals 1 to 9 may, for example, be terminals making up an Internet of Things (IoT) environment 10, and these may be connected to the server 100.

For example, the plurality of external terminals 1 to 9 making up the IoT environment 10 may, for example, be connected and in communication to each other through various wired and wireless communication networks, and may be configured to communicate with the server 100. However, example embodiments may not be so limited; for example, some of the plurality of external terminals 1 to 9 may be connected and may communicate directly with each other using, for example, a D2D communication method without passing through the network.

For the communication methods among a plurality of external terminals 1 to 9 and the communication methods of a plurality of external terminals 1 to 9 with the server 100, various wireless technologies may be used, such as, WiFi, Bluetooth, Zigbee, UWB or various wired technologies such as Ethernet and IEEE 1394, or the like. However, the example embodiments are not limited to the above.

Because IoT does not limit things to any type, the type of the terminals making up the IoT environment may include, for example a PC 1, a smart refrigerator 2, TV 3, a fan 4, a laundry machine 5, a microwave oven 6, a door lock 7, a smart bulb 8, and a portable phone 9, which are illustrated in FIG. 1. However, the types of devices or things are not limited thereto.

The server 100 may, for example, verify the hardware integrity of the plurality of external terminals 1 to 9 making up the IoT environment 10. "Hardware integrity" may, for example, indicate that the hardware making up the plurality of external terminals 1 to 9 are not damaged or tampered with (e.g. hacked or infected with a virus) and are not defective. The hardware integrity may be confirmed by verifying data related with a memory of the external terminals, which will be described below.

For example, the server 100 may store reference data to verify the hardware integrity of the plurality of external terminals 1 to 9, respectively, making up the IoT environment 10.

For example, when any one external terminal of the plurality of external terminals 1 to 9 requests hardware integrity verification of itself or another terminal, the server 100 may verify the hardware integrity of the external terminal requested to be verified using the stored reference data, and transmit the verification result to the external terminal requesting the verification.

The hardware integrity verification of the terminal in an IoT environment may be needed in various cases. For example, a second external terminal among the plurality of external terminals 1 to 9 making up the IoT environment 10 may request access to a first external terminal in order to control the first external terminal.

In this example, the first external terminal may request hardware integrity verification of the second external terminal from the server 100 to verify the hardware integrity of the second external terminal. When the server 100 verifies the hardware integrity of the second external terminal using, for example, the stored reference data and transmits the verification result to the first external terminal, the first external terminal may receive the verification result, and determine whether or not to approve the accessing of the second external terminal based on the verification result.

The above example is merely one of various example embodiments. Hardware integrity verification may be necessary in various cases such as when data is transmitted and received among a plurality of external terminals 1 to 9 in the IoT environment 10 or when a new external terminal is installed in the IoT environment 10.

The example system for verifying the hardware integrity may verify the hardware integrity of a corresponding terminal when the hardware integrity verification is requested. As a result, a more secure IoT internet environment may be realized.

The above describes an example in which a plurality of external terminals 1 to 9 included in a hardware integrity verification system are terminals making up an IoT environment for the convenient explanation. However, the network environment including a plurality of external terminals 1 to 9 may not be limited to the above. For example, the plurality of external terminals 1 to 9 may be terminals making up a home network environment. Thus, the network environment is not limited, as discussed below by the following explanation.

Examples of operation of the server 100 will be described below with reference to FIGS. 2 to 6.

Figure 2:
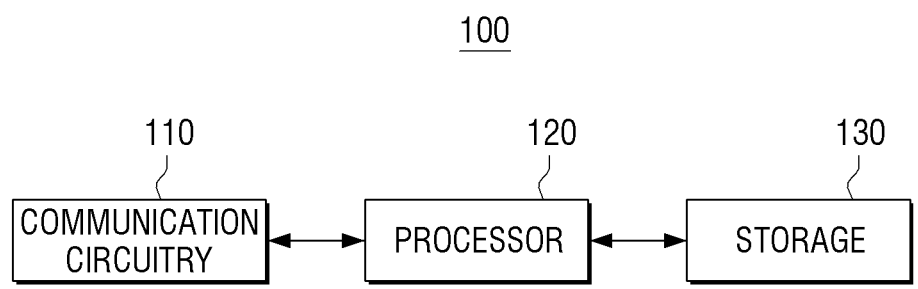
FIG. 2 is a block diagram illustrating an example server.

FIG. 2 is a block diagram illustrating an example of the server. Referring to FIG. 2, the server 100 may include a communicator (e.g., including communication circuitry) 110, a processor (e.g., including processing circuitry) 120, and a storage (e.g., including a memory) 130.

Figure 4:
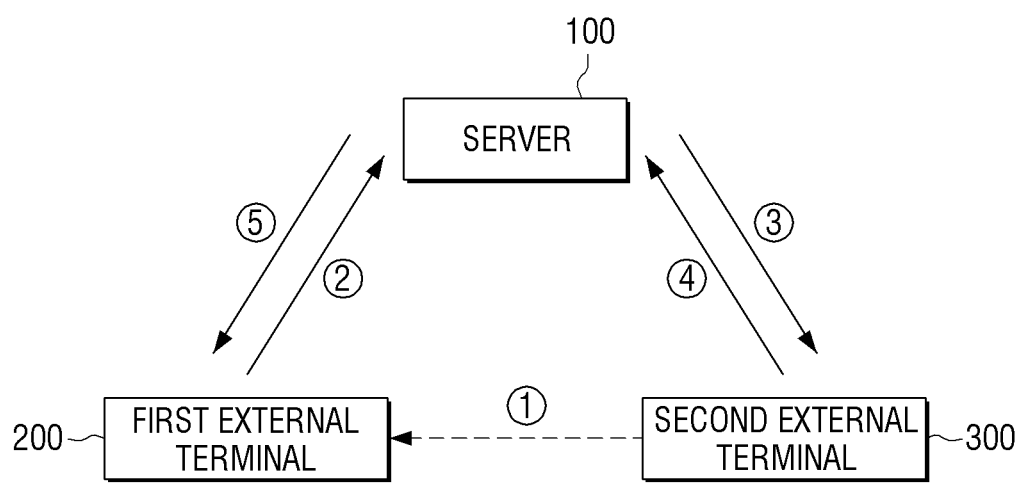
FIGS. 4, 5, 6A and 6B are diagrams illustrating various example embodiments of a server.

The communicator 110 may be configured to communicate with a plurality of external terminals 200, 300, 400, 500, 600, 700, 800 (see, e.g., FIG. 4 and FIG. 6). The plurality of external terminals may, for example, be the plurality of external terminals 1 to 9 making up the IoT environment 10 in FIG. 1. However, embodiments are not limited thereto.

For example, the communicator 110 may be configured to communicate with the plurality of external terminals through various communication networks. The network that can be used by the communicator 110 to communicate with the plurality of external terminals is not limited to a specific method. Accordingly, various communications means and methods may be used, such as, for example, and without limitation, a portable communication network such as CDMA, GSM, HSPA+, LTE, and so on, a near field communication network such as WiFi, Bluetooth, Wibro, Wimax, Zigbee, and so on, a wired communication network such as Ethernet, xDSL (ADSL, VDSL), HybridFiber Coaxial Cable (HFC), and so on, may be used.

The storage 130 may store various programs and data for the operation of the server 100. For example, the storage 130 may store reference data to verify the hardware integrity of the plurality of external terminals. The reference data may include, for example data secured with the integrity information (e.g., reference data), and previously provided from manufacturers regarding the plurality of external terminals. However, embodiments are not limited thereto. Regarding the external terminal in which the reference data is not provided from manufacturers, the corresponding external terminal may provide the reference data by, for example, the spoken request of a user using the external terminal when being initially installed.

According to an example embodiment, the reference data for the hardware integrity verification stored in the storage 130 may be data related with the memory of the external terminal. The memory of the external terminal may include, for example, at least one among a ROM, a RAM, an NVRAM and a flash memory, or the like. Further, the reference data may include, for example, at least one data among data of BIOS, a boot loader and firmware stored in ROM, data of read only (RO) areas of RAM, data of chip ID, and a flash translation layer (FTL) version and operating system (OS) images of the flash memory, and data of the startup configuration of non-volatile RAM (NVRAM).

Further, the storage 130 may store the verification result of the hardware integrity regarding the plurality of external terminals.

The processor 120 may be configured to control overall operation of the server 100. For example, the processor 120 may be configured to perform the hardware integrity verification of the external terminal. The processor 120 may be configured to perform the hardware integrity verification of a corresponding external terminal by comparing the stored reference data for the hardware integrity verification in the storage 130 with the current memory-related data received from the external terminal.

For example, for the hardware integrity verification of the external terminal A, the processor 120 may be configured to compare the stored reference data of the external terminal A in the storage 130 with the received data for the hardware integrity verification from the external terminal A. When the stored reference data matches the received data, the hardware integrity of the external terminal A may be determined to be normal (e.g., the hardware integrity of the external terminal may be verified). If not, the integrity may be determined to be abnormal (e.g., the hardware integrity of the external terminal may not be verified).

Figure 3:
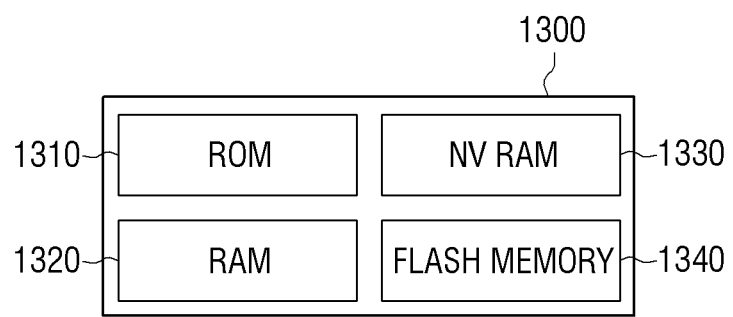
FIG. 3 is a diagram illustrating an example memory of a user terminal or an external terminal.

Referring to FIG. 3, the following will describe an example method in which the processor 120 is configured to perform hardware integrity verification of the external terminal. FIG. 3 is a diagram illustrating an example of the memory 1300 of the external terminal A. Referring to FIG. 3, the memory 1300 includes, for example, a ROM 1310, a RAM 1320, an NVRAM 1330, and a flash memory 1340.

The integrity of the memory related data is secured because manufactures are aware of the memory 1300 related data of the external terminal A at manufacturing process, and the external terminal is not yet used by a user. Manufacturers may provide the memory related data to the server 100, and the server 100 may be provided with the memory related data and store the same in the storage 130 as reference data for the hardware integrity verification of the external terminal A.

The memory related data may, for example, be data of a BIOS, a boot loader, and firmware stored in ROM 1310, data of RO areas of RAM 1320, data of the chip ID or FTL version and OS 1341 images of the flash memory 1340, and data of the startup configuration of NVRAM 1330.

The memory related data may be data which is not modified due to the use of the external terminal A. The memory related data may be reference data that may be used to verify hardware integrity.

In response to a request for hardware integrity verification of the external terminal A, the processor 120 may be configured to request transmission of data for hardware integrity verification to the external terminal A through the communicator 110. When the external terminal A transmits the data for the hardware integrity verification in response to such request, the processor 120 may be configured to compare the reference data of the external terminal A stored in the storage 130 with the data for the hardware integrity verification received from the external terminal A, and verify the hardware integrity of the external terminal A.

For example, the data for the hardware integrity verification transmitted by the external terminal A to the server 100 may be data related with the memory 1300 at the time the external terminal A receives the request for the transmission of data for the hardware integrity verification from the server 100.

The external terminal A may, for example, collect the data of BOIS, boot loader and firmware stored in ROM 1310, the data of RO areas of RAM 1320, the data of the chip ID or FTL version and OS 1341 images of the flash memory 1340, and the data of the startup configuration of NVRAM 1330 when the data transmission for the hardware integrity verification is requested, and transmit to the server 100.

The processor 120 may be configured to compare the data related with the memory 1300 of the external terminal A received through the communicator 110, with the reference data of the external terminal A stored in the storage 130, and verify the hardware integrity.

According to an example embodiment, the processor 120 may be configured to verify the memory related data of the external terminal, and verify the hardware integrity of the corresponding external terminal.

According to an example embodiment, the reference data for the hardware integrity verification of the external terminal A stored in the storage 130, and the memory related data received from the external terminal 1300 may be a hash of the data. For, because data having a hash function applied thereto cannot be reverse processed to restore the original data, the possibility to be tampered becomes zero or very small. The hardware integrity of the external terminal may be verified more securely and accurately with smaller data amount by using a hash of the data.

A manufacturer of the external terminal A may provide the reference data for the hardware integrity verification of the external terminal A as hash values of the data to the server 100, and the server 100 may store the same in the storage 130. When the hardware integrity verification of the external terminal A is requested to the server 100, the processor 120 may be configured to request the data transmission for the hardware integrity verification to the external terminal A, and the external terminal A may convert the memory 1300 related data at the time of receiving the request for the data transmission into hash values by applying hash algorithms, and transmit the converted hash values to the server 100. The processor 120 may be configured to compare hash values received from the external terminal A through the communicator 110 with hash values of the external terminal A stored in the storage 130, and to verify the hardware integrity of the external terminal A.

However, the above is merely one of embodiments. Another encrypting or encoding method instead of hash data may be applied to the reference data stored in the server 100 and the memory related data transmitted by the external terminal.

According to an example embodiment, the reference data of the external terminal may not be provided by a manufacturer, in which case the reference data of the external terminal may be provided when the external terminal is installed. For example, a manufacturer of the external terminal A may not provide the data for the hardware integrity verification of the external terminal A to the server 100 according to contracts, etc. between a manufacturer of the external terminal and an operator of the server 100.

In this case, when the external terminal A is installed, e.g., when the external terminal A is initially connected to the IoT environment as illustrated in FIG. 1, a user of the external terminal A may transmit the memory related data of the external terminal A at the time of being installed to the server 100, and register the reference data for the hardware integrity verification of the external terminal A.

Because the memory related data 1300 at the time of initial installing of the external terminal A is after the external terminal A is sold, but before connecting to the various networks and the used, the memory 1300 related data may have little or no possibility of be tampered with. The memory 1300 related data at the time of initial installing of the external terminal A may be registered on the server 100 as reference data to verify the hardware integrity. When the hardware integrity verification of the external terminal A is requested, the registered data may be used in verifying the hardware integrity of the external terminal A.

A method of registering the reference data for hardware integrity verification of the external terminal A may, for example, involve providing an application from the server 100 to the external terminal A, in which the application includes a function for collecting the memory related data from the memory of the external terminal and converting the same into hash values, and transmitting the converted hash values to the server 100.

A user of the external terminal A may register the memory 1300 related data of the external terminal A at the time of initial installing of the external terminal A, as data for the hardware integrity verification of the external terminal A through the above application.

Even when the server 100 requests the data transmission for the hardware integrity verification based on the request for the hardware integrity verification of the external terminal A, the hardware integrity of the external terminal A may be verified by collecting and transmitting the memory 1300 related data at the time the data transmission is requested to the server 100, through the above application.

The processor 120 may be configured to perform the hardware integrity verification of the external terminal for which hardware integrity verification is requested, using the reference data stored in the storage 130. Below, the processor 120 according to various example embodiments will be described by referring to FIGS. 4 to 6.

FIG. 4 is a diagram illustrating an example in which the first external terminal 200 requests hardware integrity verification of a second external terminal 300 different from the first external terminal 200 from the server 100.

When a request for the hardware integrity verification of the second external terminal 300 is received through the communicator 110 from the first external terminal 200, the processor 120 of the server 100 may be configured to verify the hardware integrity of the second external terminal 300 using the reference data stored in the storage 130.

For example, when the second external terminal 300 is attempting to access the first external terminal 200 (process ①) such as, when the second external terminal 300 of the plurality of external terminals making up the IoT environment is attempting to access the first external terminal 200 for controlling purpose, or when the second external terminal 300 is attempting to read specific data on the first external terminal 200, or when the second external terminal 300 is attempting to access the first external terminal 200 for initial connecting, the first external terminal 200 may transmit the request for the hardware integrity verification of the second external terminal 300 to the server (process ②).

When the request for the hardware integrity verification of the second external terminal 300 is received through the communicator 110, the processor 120 may be configured to control the communicator 110 to request data transmission for the hardware integrity verification to the second external terminal 300 (process ③).

When the memory related data of the second external terminal 300 is received from the second external terminal (process ④), the processor 120 may be configured to compare the received memory related data with the reference data of the second external terminal 300 stored in the storage 130, verify the hardware integrity of the second external terminal 300 as described above, and control the communicator 110 to transmit the verification result to the first external terminal 200 (process ⑤).

The first external terminal 200 receiving the verification result may determine whether the access attempt of the second external terminal 300 is allowed or not based on the verification result.

Referring to the example embodiment of FIG. 4, the first external terminal 200 may not necessarily require an access attempt of the second external terminal 300 to the first external terminal 200, to request the hardware integrity verification of the second external terminal to the server 100. According to an example embodiment, even when there is no access attempt to the first external terminal 200 performed by the second external terminal 300, the first external terminal 200 may request the hardware integrity verification of the second external terminal 300 to the server 100. Because of this example, the process ① is indicated in a dotted line in FIG. 4.

For example, a user of the first external terminal 200 may confirm the external terminals connected to the first external terminal 200 in an IoT environment, and verify the hardware integrity of the second external terminal 300. In this case, even when there is no access attempt of the other external terminals, the first external terminal 200 may transmit a request for the hardware integrity verification of the second external terminal 300 to the server 100 based on a user manipulation, and receive the verification result regarding the hardware integrity verification of the second external terminal.

According to an example embodiment, the first external terminal 200 may display the connected external terminals. Further, a user may select the external terminal which he wants for the hardware integrity verification, and request the hardware integrity verification of the corresponding terminal to the server 100.

The first external terminal 200 may request the hardware integrity verification of the other external terminals connected to the first external terminal 200 to the server 100, and the processor 120 may be configured to control the communicator 110 to transmit the verification result corresponding to the request of the first external terminal 200 to the first external terminal 200 among the verification results stored in the storage 130, and thus, the first external terminal may display the connected external terminals respectively with the hardware integrity verification results. In this case, a user may confirm the hardware verification results of the displayed external terminals, and select the external terminal to be verified on the hardware integrity.

Although the example embodiment of FIG. 4 describes that the hardware verification result of the second external terminal is transmitted to the first external terminal 200 which requests the verification, the hardware verification result may be also transmitted to the second external terminal 300 to be verified.

According to an example embodiment, when the memory related data received from the second external terminal 300 has at least partial non-matching with the reference data for the hardware integrity verification of the second external terminal 300 stored in the storage 130, the processor 120 may be configured to generate a warning message including the information regarding the non-matching part.

For example, the second external terminal 300 may include the memory 1300 as illustrated in FIG. 3, and the storage 130 of the server 100 may store the data of BIOS, boot loader, and firmware in ROM 1310, the data of RO areas of RAM 1320, the data of the chip ID or FTL version and OS 1341 images of the flash memory 1340, and the data of the start up configuration of NVRAM 1330 as the reference data for the hardware integrity verification of the second external terminal 300.

When the first external terminal 200 requests the hardware integrity verification of the second external terminal 300, the processor 120 may be configured to control the communicator 110 to request the data transmission for the hardware integrity verification to the second external terminal 300.

When the second external terminal 300 collects and transmits the data of BIOS, boot loader and firmware in ROM 1310, the data of RO areas of RAM 1320, data of the chip ID or FTL version and OS 1341 images of the flash memory 1340, and the data of the startup configuration of NVRAM 1330 as memory 1300 related data, the processor 120 may be configured to compare the received memory 1300 related data with the reference data for the hardware integrity verification of the second external terminal 300 stored in the storage 130, and verify the hardware integrity of the second external terminal 300.

When the received memory 1300 related data has complete matching with the stored reference data, the processor 120 may be configured to determine hardware integrity of the second external terminal 300.

When the received memory 1300 related data has at least partial non-matching with the stored reference data, the processor 120 may be configured to determine that the hardware integrity of the second external terminal 300 has a problem. According to an example embodiment, the processor 120 may be configured to generate a warning message including the information regarding the non-matching part from the stored reference data.

Figure 5:
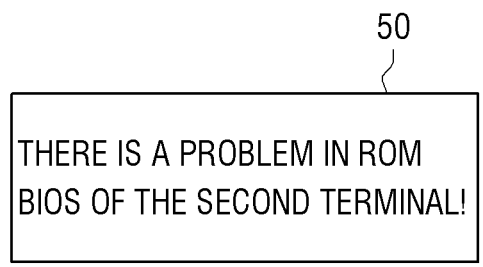

FIG. 5 is a diagram illustrating an example of a warning message. For example, when the data of BIOS in ROM among the reference data for the hardware integrity verification of the second external terminal 300 stored in the storage 130 has non-matching with the data of BIOS in ROM among the received memory 1300 related data from the second external terminal 300, and when the other data matches, the processor 120 may be configured to determine that the hardware integrity of the second external terminal 300 has a problem. As illustrated in FIG. 5, the processor 120 may generate the warning message 50 such as "There is a problem in ROM BIOS of the second external terminal!" including the information regarding the non-matching part, i.e., ROM.

The processor 120 may be configured to control the communicator 110 to transmit the generated warning message 50 to at least one of the first external terminal 200 and the second external terminal 300.

Figure 6A:
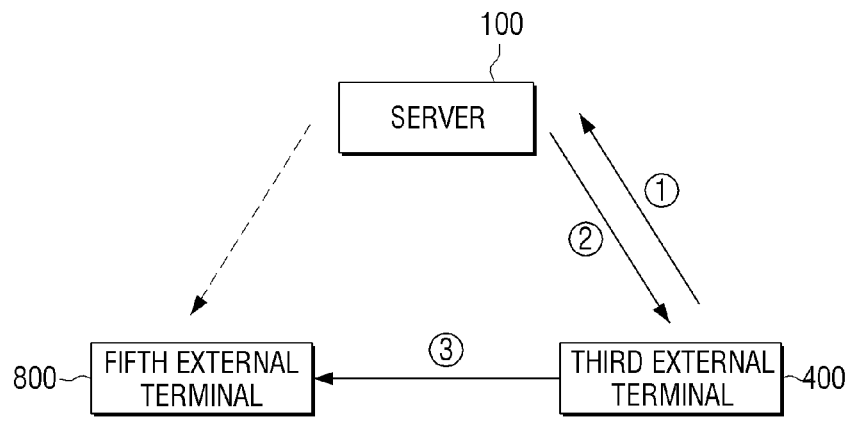
Figure 6B:
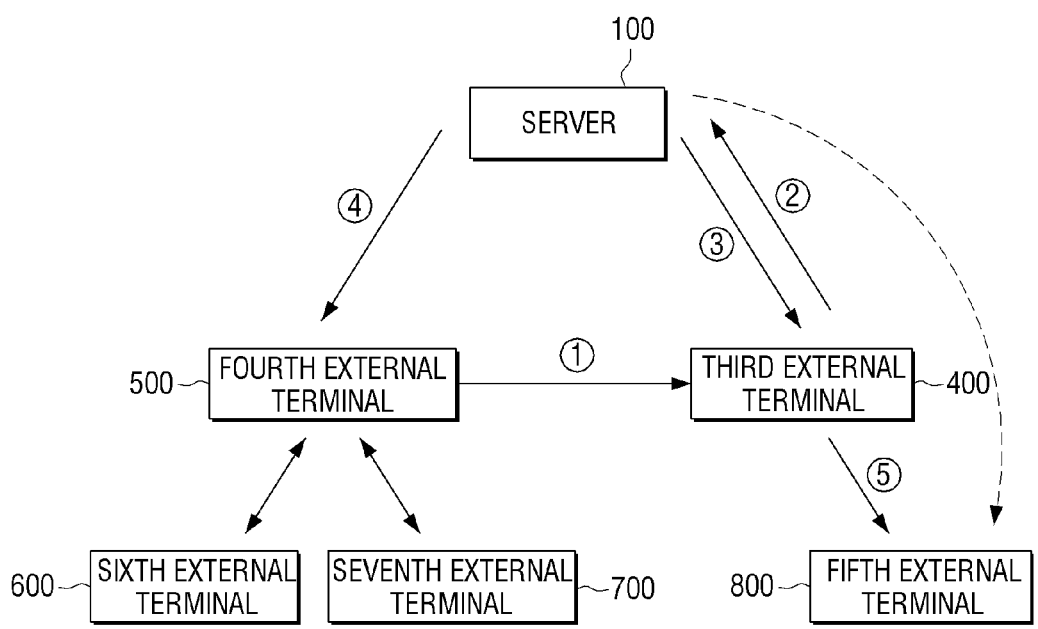

FIGS. 6A and 6B are diagrams illustrating example embodiments in which the external terminal activated with a hardware integrity self-verification function requests the verification of its own hardware integrity to the server 100.

The 'self-verification function' may, for example, refer to a situation in which the external terminal requests the verification of its own hardware integrity to the server 100 and receives the hardware integrity verification, rather than that one external terminal requesting the hardware integrity verification of another external terminal to the server 100. According to an example embodiment, the external terminal activated with the self-verification function may first verify its own hardware integrity and next access another external terminal when attempting to access another external terminal.

For example, as illustrated in FIG. 6A, when the hardware integrity self-verification function of the third external terminal 400 is activated, the third external terminal 400 may request verification of its own hardware integrity to the server 100 (process ①).

When a request for the hardware integrity verification of the third external terminal 400 is received through the communicator 110, the processor 120 may be configured to verify the hardware integrity of the third external terminal 400 using the reference data for the hardware integrity verification of the third external terminal 400 stored in the storage 130.

For example, the third external terminal 400 may transmit the memory related data of the third external terminal 400 to the server 100 when requesting the hardware integrity verification. The processor 120 may be configured to compare the received memory related data of the third external terminal 400 with the reference data for the hardware integrity verification of the third external terminal 400 stored in the storage 130, and verify the hardware integrity of the third external terminal 400.

However, embodiments are not be limited to the above. For example, when a request for the hardware integrity verification is received from the third external terminal 400, the processor 120 may be configured to control the communicator 110 to request the data transmission for the hardware integrity verification to the third external terminal 400. When the memory related data is received from the third external terminal 400 in response to the data transmission request, the processor 120 may be configured to compare the received memory related data with the stored reference data, and verify the hardware integrity of the third external terminal 400.

When the hardware integrity verification of the third external terminal 400 is performed as described above, the processor 120 may be configured to control the communicator 110 to transmit the verification result to the requesting third external terminal 400 (process ②).

The third external terminal 400 may perform a accessing or a connecting to a fifth external terminal 800 which is another external terminal after the verifying the hardware integrity of the third external terminal 400 (process ③).

The self-verification function of the third external terminal 400 may be advantageous when the fifth external terminal 800 has no function to verify the hardware integrity and has no option to verify the hardware integrity of the third external terminal 400 through the server 100, while the third external terminal 400 is attempting to control or access the fifth external terminal 800.

When the third external terminal 400 is found to have a problem in the hardware integrity as a result of verifying the hardware integrity, the third external terminal 400 may not access the fifth external terminal 800. The example embodiments may thus support building more secure network environment.

The example embodiment of using the self-verification function may not be limited to those provided above. Even when the fifth external terminal 800 has the hardware integrity self-verification function, the third external terminal 400 activated with the self-verification function may verify the hardware integrity of itself and access the fifth external terminal 800.

According to another example embodiment, when the third external terminal 400 requests verification of its own hardware integrity to the server 100, the third external terminal 400 may additionally transmit the information regarding the external terminal to be accessed after the verification, e.g., the information regarding the fifth external terminal 800. In this case, the processor 120 may be configured to control the communicator 110 to transmit the verification result regarding the hardware integrity of the third external terminal 400 to the fifth external terminal 800. The dotted line in FIG. 6A represents the above example.

FIG. 6B illustrates an example embodiment in which the hardware integrity self-verification function is activated by another external terminal. Referring to FIG. 6B, the hardware integrity self-verification function of the third external terminal 400 may be activated by a fourth external terminal 500 connected to the third external terminal 400 (process ①). In this case, the third external terminal 400 may request the hardware integrity verification of the third external terminal 400 to the server 100 in order to verify its own hardware integrity before accessing the fifth external terminal 800 (process ②).

When the memory related data of the third external terminal 400 is received through the communicator 110, the processor 120 may be configured to verify the hardware integrity of the third external terminal 400, and to control the communicator 110 to transmit the verification result to the third external terminal 400 (process ③).

In this example, the processor 120 may be configured to control the communicator 110 to transmit the hardware integrity verification result of the third external terminal 400 to the fourth external terminal 500 which activated the self-verification function of the hardware integrity for the third external terminal (process ④).

The third external terminal 400 receiving the verification result may access the fifth external terminal 800 based on the verification result of the third external terminal 400 (process ⑤).

A user may activate the self-verification function of the hardware integrity of another external terminal using one terminal among the plurality of external terminals of the IoT environment. The example embodiment illustrated in FIG. 6B may be one example. When a user of the fourth external terminal 500 confirms the external terminals 400, 600, 700 connected to the fourth external terminal 500 and activates the hardware integrity self-verification function of the third external terminal 400, the processor 120 may be configured to control the communicator 110 to transmit the hardware integrity verification result of the third external terminal 400 to the fourth external terminal 500.

A user terminal according to various example embodiments will be described with reference to FIGS. 7 to 11. The user terminal may, for example, be any one terminal which is one among the plurality of external terminals 1 to 9 in the hardware integrity verification system described above. The plurality of external terminals 1 to 9 making up the hardware integrity verification system may form an IoT environment. Because the type of things of an IoT environment is not limited, the type of the user terminal 1000 making up the IoT environment may also not be limited.

Figure 7:
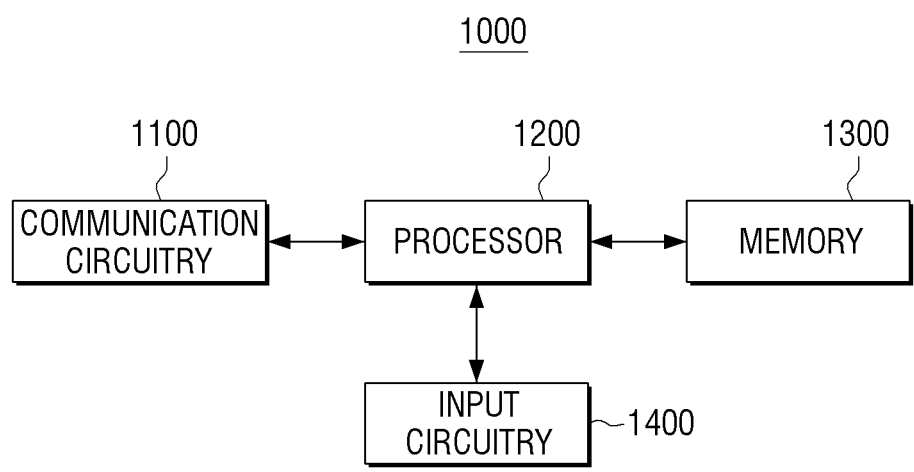
FIG. 7 is a block diagram illustrating an example user terminal.

FIG. 7 is a block diagram illustrating an example of the user terminal. Referring to FIG. 7, the user terminal 1000 includes, for example, the communicator (e.g., including communication circuitry) 1100, the processor (e.g., including processing circuitry) 1200, the memory 1300, and an inputter (e.g., including input circuitry) 1400.

The communicator 1100 may include, for example, communication circuitry configured to communicate with the server 100 and at least one of the plurality of external terminals. For example, the communicator 1100 may communicate with the server 100 and at least one of the plurality of external terminals through various wired and wireless networks. Examples of networks that can be used by the communicator 1100 may not be limited to specific methods or types. For example, the portable communication network such as CDMA, GSM, HSPA+, LTE, and so on, the near field communication network such as WiFi, Bluetooth, Wibro, Wimax, Zigbee, and so on, and the wired communication network such as Ethernet, xDSL (ADSL, VDSL), HFC (Hybrid Fiber Coaxial Cable), and so on may be used. The communicator 1100 may, for example, communicate directly with the external terminal using, for example, a D2D method without requiring a network.

The communicator 1100 may be configured for communication using the networks described above, and may be configured for D2D communication.

The memory 1300 may, for example, store various programs and data for the operation of the user terminal. The memory 1300 may include, for example, at least one among ROM 1310, RAM 1320, the flash memory 1340, and NVRAM 1330. FIG. 3 illustrates an example embodiment of the memory 1300.

The inputter 1400 may be configured to receive a command, such as, for example, a user command regarding the user terminal. For example, the inputter 1400 may receive a user command to access one external terminal of the plurality of external terminals. The inputter 1400 may, for example, be implemented to include a button, a touch panel, a remote control device provided on the user terminal 1000

(when the user terminal is controlled with the external remote control device), and so on.

The processor 1200 may be configured to control overall operation of the user terminal 1000. For example, when the data transmission for the hardware integrity verification is requested through the communicator 1100 by the server 100, the processor 1200 may be configured to control the communicator 1100 to transmit the memory related data of the memory 1300 to the server 100 in response to the transmission request.

For example, when the data transmission for the hardware integrity verification is requested by the server 100, the processor 1200 may be configured to collect the data of at least one among BIOS, boot loader and firmware stored in ROM 1310, RO areas of RAM 1320, the chip ID, FTL version and OS images of the flash memory 1340, the startup configuration of NVRAM 1330, and to control the communicator 1110 to transmit the collected data as memory related data.

According to an example embodiment, the processor 1200 may be configured to generate hash values regarding the collected memory related data using, for example, hash algorithms, and to control the communicator 1110 to transmit the generated hash values as memory related data.

According to an example embodiment, the user terminal 1000 may register on the server 100 the reference data for the hardware integrity verification of the user terminal 1000. For example, when the user terminal 1000 is initially installed, such as for example, when the user terminal is initially installed in the IoT environment as illustrated in FIG. 1 and when a user manipulation command to register the reference data is input through, for example, the inputter 1400, the processor 1200 may be configured to collect the memory related data of the memory 1300 and to control the communicator 1100 to transmit the collected memory related data to the server 100. The server 100 may register the memory related data received from the user terminal 1000 at the time of initial installing as reference data for the hardware integrity verification of the user terminal 1000.

Figure 8A:
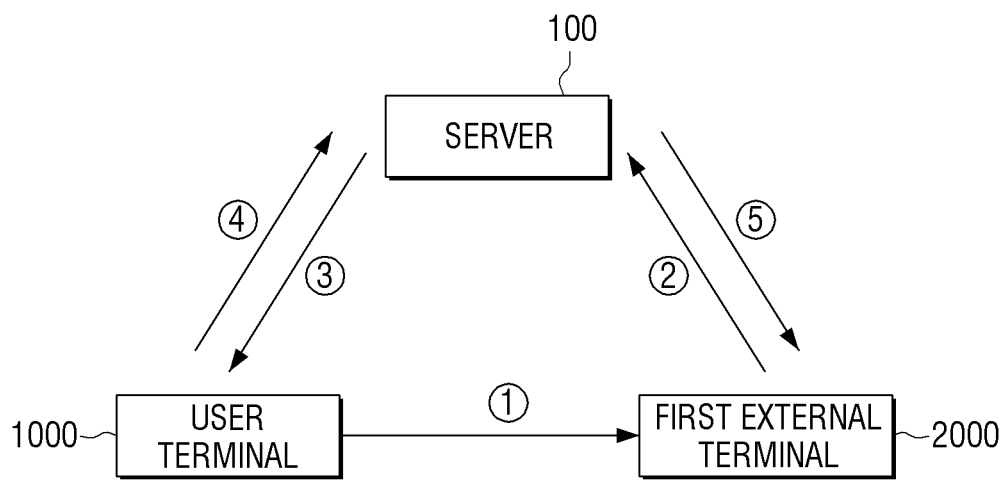
FIGS. 8A, 8B and 9 are diagrams illustrating various example embodiments of a user terminal.
Figure 8B:
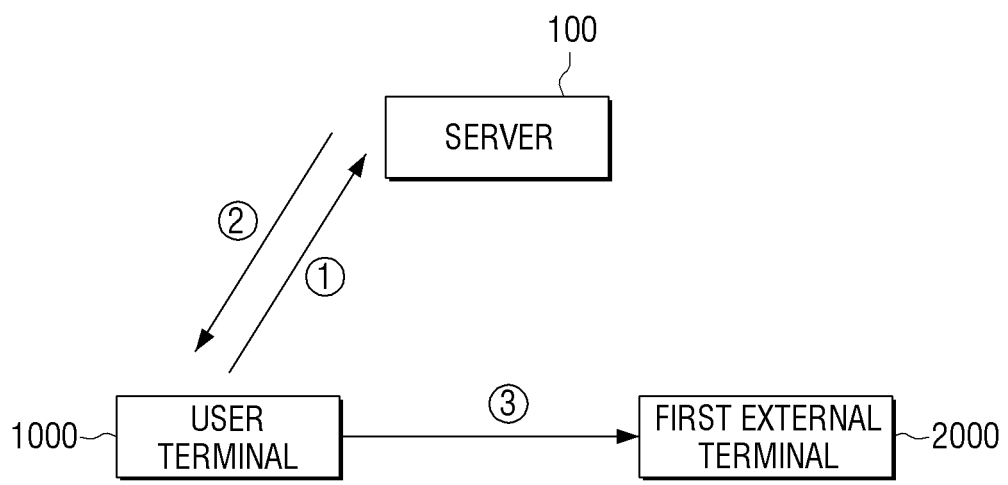

Various example operations of the processor 1200 will be described below with reference to FIGS. 8A, 8B and 9. FIGS. 8A and 8B illustrate example embodiments in which the hardware integrity of the user terminal 1000 is verified through the server 100.

For example, FIG. 8A illustrates an example in which the user terminal 1000 accesses the first external terminal 2000. For example, when the user terminal 1000 is attempting to control the first external terminal 2000 or connect to the data stored in the first external terminal 2000, the first external terminal 2000 may verify the hardware integrity of the user terminal 1000 and determine whether to approve the controlling or the accessing based on the verification result. However, embodiments are not limited thereto. For example, when the user terminal 1000 is attempting to initially connect to the first external terminal 2000, the first external terminal 2000 may also verify the hardware integrity of the user terminal 1000 and then determine whether or not to connect.

As illustrated in FIG. 8A, when a user command to access the first external terminal 2000 of the plurality of external terminals is input through the inputter 1400 of the user terminal 1000, the processor 1200 may be configured to control the communicator 1100 to transmit the access request to the first external terminal 2000 (process ①). When the first external terminal 2000 requests the hardware integrity verification of the user terminal 1000 to the server 100 (process ②), the server 100 may request the data transmission for the hardware integrity verification to the user terminal 1000.

When the data transmission request for the hardware integrity verification of the user terminal is received from the server 100 through the communicator 1100 (process ③), the processor 1200 may be configured to collect the memory related data of the memory 1300 in response to the data transmission request and control the communicator 1100 to transmit to the server 100 (process ④).

The server 100 may perform the hardware integrity verification of the user terminal 1000 and transmit the verification result to the first external terminal 2000 (process ⑤). The first external terminal 2000 may determine whether to approve the access request of the user terminal 1000 based on the verification result.

FIG. 8B is a diagram illustrating an example operation of the processor 1200 when the hardware integrity self-verification function of the user terminal 1000 is activated. Referring to FIG. 8B, when a user command to access the first external terminal 2000 is input through the inputter 1400, the user terminal 1000 activated with the hardware integrity self-verification function may collect the memory related data of the memory 1300, and control the communicator 1100 to transmit the collected memory related data to the server 100 (process ①).

According to an example embodiment, the processor 1200 may be configured to first control the communicator 1100 to transmit the verification request on the hardware integrity of the user terminal 1000 to the server 100. When the data transmission request on the hardware integrity is received from the server 100 (process ②), the processor 1200 may be configured to control the communicator 1100 to transmit the memory related data to the server 100 in response to the request.

When the verification result that the hardware integrity of the user terminal 1000 has no problem is received from the server 100, the processor 1200 may be configured to control the communicator 11000 to transmit the access request to the first external terminal 2000 (process ③).

When the hardware integrity self-verification function of the user terminal 1000 is activated, the priority may be established such that, even when the user command is to access different external terminal, instead of directly requesting access to the different external terminal, the hardware integrity verification of the user terminal 1000 may be performed through the server 100, after which accessing the different external terminal may be requested.

Of course, when the verification result informing that the hardware integrity of the user terminal 1000 has a problem is received from the server 100, the processor 1200 may be configured to not request access to the first external terminal 2000.

As described above, the hardware integrity verification of the user terminal 1000 may be securely and particularly useful when the first external terminal 2000 which the user terminal 1000 is attempting to access is a terminal that may not verify the hardware integrity of another terminal through the server 100.

Figure 9:
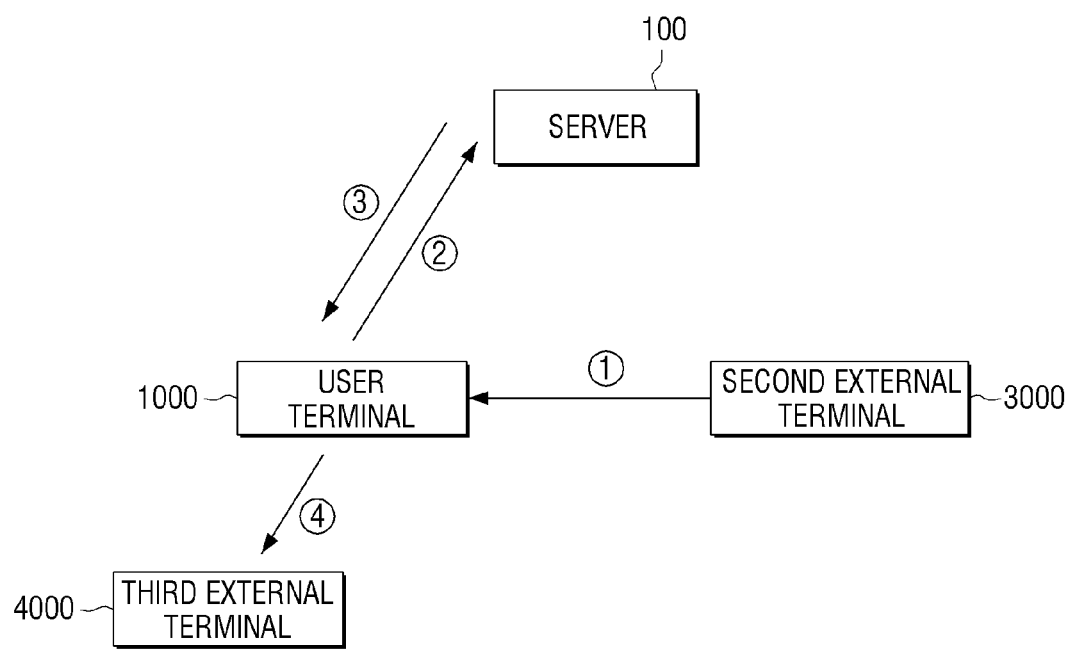

FIG. 9 is a diagram illustrating various example operations of the processor 1200 when the user terminal 1000 receives the access request from another external terminal.

Referring to FIG. 9, when the second external terminal 3000 of the plurality of external terminals requests accessing of the user terminal (process ①), the processor 1200 may be configured to control the communicator 1100 to transmit the verification request on the hardware integrity of the second external terminal to the server 100 (process ②). When the hardware integrity verification result of the second external terminal 3000 is received from the server 100 (process ③), the processor 1200 may be configured to determine whether to approve the access request to the second external terminal 3000 based on the received verification result.

For example, when the verification result that the hardware integrity of the second external terminal 3000 has no problem is received, the processor 1200 may be configured to allow the access request to the second external terminal 3000.

When the verification result that the hardware integrity of the second external terminal 3000 has a problem is received from the server 100, the processor 1200 may be configured to reject the access request of the second external terminal 3000. According to an example embodiment, the processor 1200 may be configured to control the communicator 1100 to transmit a message that the hardware integrity of the second external terminal 3000 has a problem to another external terminal connected to the user terminal 1000.

As illustrated in FIG. 9, when the third external terminal 4000 is connected to the user terminal 1000 and when the verification result that the hardware integrity of the second external terminal 3000 has a problem is received from the server 100, the processor 1200 may be configured to reject the access request of the second external terminal 3000, to generate a message that the hardware integrity of the second external terminal 3000 has a problem, and to control the communicator 1100 to transmit the message to the third external terminal 4000 (process ④).

The third external terminal 4000 receiving the message may terminate the connection when the third external terminal 4000 is also connected to the second external terminal 3000, and deliver the message that the hardware integrity of the second external terminal 3000 has a problem to another external terminals connected to the third external terminal 4000.

According to an example embodiment, when one external terminal (e.g., the second external terminal 3000) of the plurality of terminals making up the network is determined to have a problem on the hardware integrity, the external terminal (e.g., the user terminal 1000) discovering it may inform the other terminals (e.g., the third external terminal 4000) connected to the external terminal, and the neighboring terminal (e.g., the third external terminal 4000) receiving it may also deliver the message to the other connected terminals. Thus, overall security of the network can be maintained.

Figure 10:
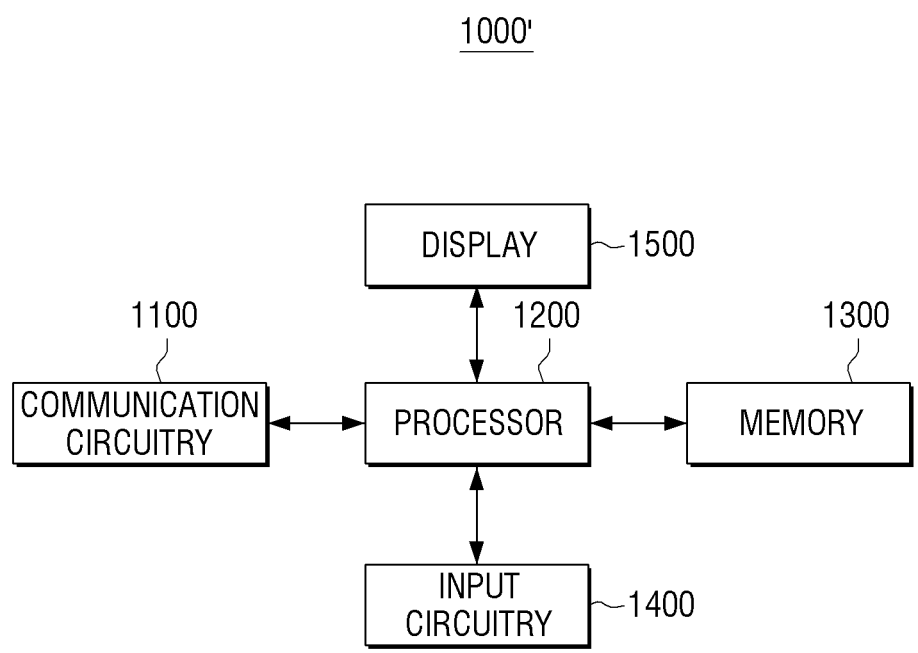
FIG. 10 is a block diagram illustrating an example user terminal.

FIG. 10 is a block diagram illustrating an example of the user terminal. In describing the example embodiment by referring to FIG. 10, the elements or operations overlapping with those described above with reference to FIGS. 7 to 9 will not be explained below for the sake of brevity. In FIG. 10, the user terminal 1000' includes the communicator (e.g., including communication circuitry) 1100, the processor (e.g., including processing circuitry) 1200, the memory 1300, the inputter (e.g., including input circuitry) 1400 and a display 1500.

The display 1500 may display various images. For example, the display 1500 may display the plurality of external terminals connected through the communicator 1100 based on the controlling of the processor 1200 and the hardware integrity verification state of the plurality of external terminals. When the display 1500 displays the plurality of external terminals, the display 1500 may be configured to display the external terminal provided with the hardware integrity self-verification function to be distinguished from another external terminal not provided with the hardware integrity self-verification function under the control of the processor 1200.

The display 1500 may be implemented, for example, to be various formats of the display such as liquid crystal display (LCD), organic light emitting diode (OLED), plasma display panel (PDP) and so on, and depending on embodiments, may be implemented, for example, to be a touch screen form with a touch panel.

The inputter 1400 may receive a verification command on the hardware integrity of at least one external terminal of the plurality of external terminals displayed on the display 1500. Further, the inputter 1400 may receive a user command for activating the hardware integrity self-verification function of at least one external terminal of the external terminals provided with the hardware integrity self-verification function which are displayed on the display 1500.

When a command for the hardware integrity verification of at least one external terminal of the plurality of external terminals displayed on the display 1500 is input through the inputter 1400, the processor 1200 may be configured to control the communicator 1100 to transmit a request for the hardware integrity verification of the external terminal in which the verification command is input to the server 100.

For example, because the user terminal 1000 communicates with the plurality of external terminals through the communicator 1100, the processor 1200 may be configured to acquire the information regarding the plurality of external terminals, and to control the display 1500 to display the plurality of external terminals by using the acquired information.

Further, the storage 130 of the server 100 may, for example, store the verification results regarding the plurality of external terminals in which the hardware integrity is verified through the server 100, as described above. The processor 1200 may be configured to control the communicator 1100 to request the transmission regarding the hardware integrity verification result of the plurality of external terminals connected to the user terminal 1000 to the server 100. When the verification result is received, the processor 1200 may be configured to control the display 1500 to additionally display the verification state of on the hardware integrity respectively regarding the plurality of external terminals connected to the user terminal 1000, together with the plurality of external terminals.

In this example, when a command for the hardware integrity verification of at least one external terminal among the plurality of displayed external terminals is input through the inputter 1400, the processor 1200 may be configured to control the communicator 1100 to transmit a request for the hardware integrity verification of at least one external terminal to which the verification command is input.

When the hardware integrity verification result of the external terminal for which the verification is requested is received through the communicator 1100 from the server 100, the processor 1200 may be configured to control the display 1500 to update the received verification result on the hardware integrity verification state and display the same.

Figure 11:
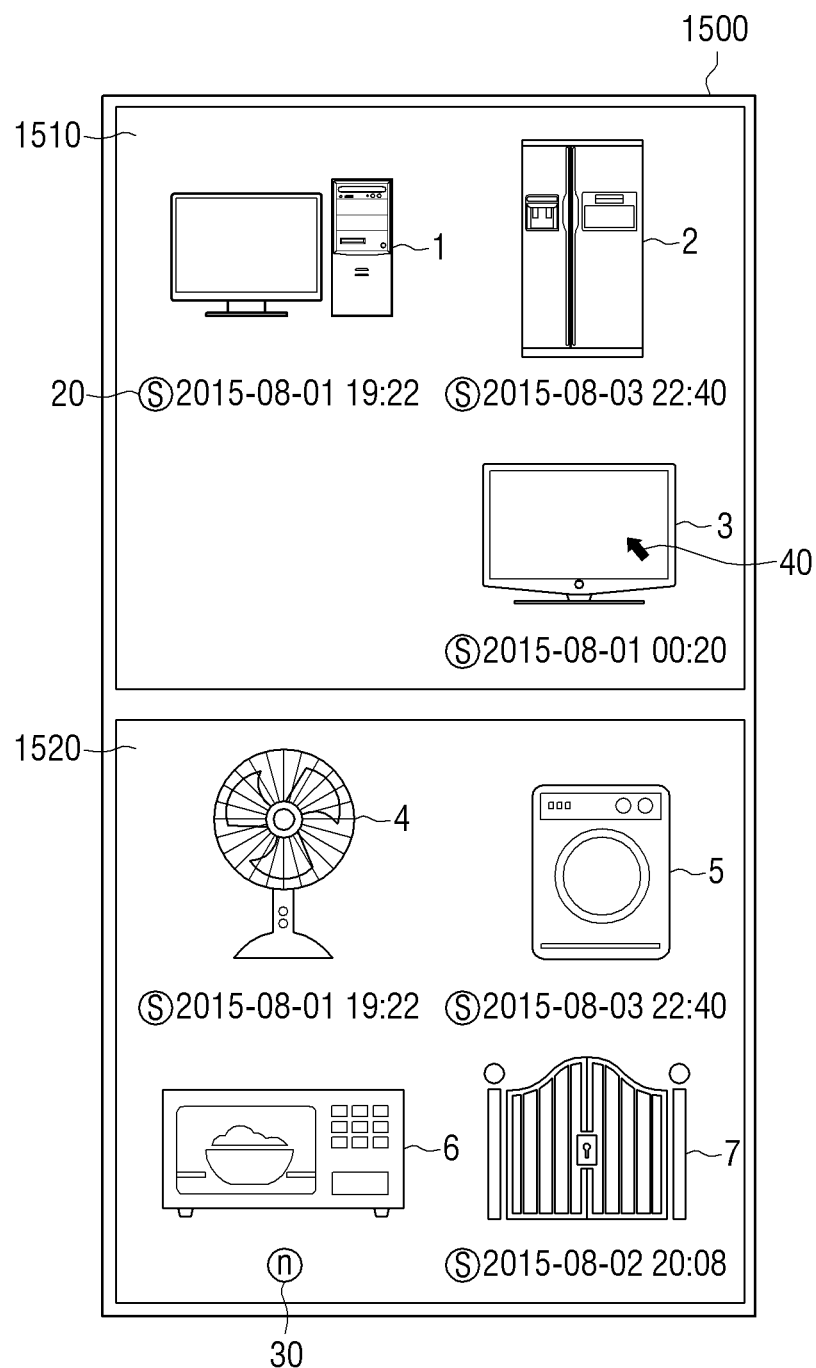
FIG. 11 is a diagram illustrating an example UI displayed on a user terminal.

FIG. 11 illustrates an example embodiment in which the display 1500 displays a plurality of external terminals connected to the user terminal 1000 and the hardware integrity verification state respectively regarding the plurality of external terminals. Referring to FIG. 11, the user terminal 1000 may be currently connected to, for example, PC 1, the refrigerator 2, TV 3, the fan 4, the laundry machine 5, the microwave oven 6, and the door lock 7.

Herein, the mark Ⓢ indicates the state in which the corresponding external terminal is verified on the hardware integrity, and, for example, the year-month-date-time displayed respectively under the external terminals indicates the latest time when the hardware integrity of the corresponding external terminal has been verified. For example, the latest time when the refrigerator 2 has been verified on the hardware integrity finally may be 22:40, Aug. 3, 2015.

Further, the mark Ⓝ 30 indicates that the hardware integrity cannot be verified because the reference data for the hardware integrity of the corresponding external terminal is not stored in the server 100. For example, the microwave oven 6 may be connected to the user terminal through the network, but does not have the hardware integrity self-verification function.

In the above example, when a user is attempting to verify the hardware integrity of TV 3, the user may input a command for the hardware integrity verification of TV 3 by manipulating a cursor 40 through the inputter 1400 and selecting TV 3. The processor 1200 may be configured to control the communicator 1100 to request the hardware integrity verification of TV 3 through the server 3. When the hardware integrity verification result of TV 3 is received from the server 100, the processor 1200 may be configured to control the display 1500 to update and display the verification result. For example, when the verification result of TV 3 is received at, 10:00 a.m., Aug. 4, 2015, the verification time may be updated under TV 3 such as "2015 Aug. 4 10:00."

According to an example embodiment, the processor 1200 may be configured to control the display 1500 to distinguish and display the external terminals provided with the hardware integrity self-verification function, from the external terminals not provided with the hardware integrity self-verification function among the plurality of external terminals connected to the user terminal 1000.

For example, when the information regarding whether the hardware integrity self-verification function is included or not is received from the plurality of external terminals connected to the user terminal 1000, the processor 1200 may be configured to distinguish the external terminals provided with the hardware integrity self-verification function among the plurality of external terminals by using the received information. The processor 1200 may be configured to control the display 1500 to distinguish and display the external terminals provided with the hardware integrity self-verification function from the external terminals not provided with the hardware integrity self-verification function.

For example, as illustrated in FIG. 11, the processor 1200 may be configured to control the display 1500 to distinguish and display the external terminals provided with the hardware integrity self-verification function on the upper end 1510 of the display 1500 and display the external terminals not provided with the hardware integrity self-verification function on the lower end 1520 of the display 1500.

When a user command for activating the hardware integrity self-verification function of at least one external terminal of the external terminals provided with the hardware integrity self-verification function is input, the processor 1200 may be configured to control the communicator 1100 to transmit the request for activating the hardware integrity verification to the external terminal in which the activating command is input.

Referring to the example of FIG. 11, PC 1, the refrigerator 2 and TV 3 may be provided with the hardware integrity self-verification function while the fan 4, the laundry machine 5, the microwave oven 6 and the door lock 7 may not be provided with the hardware integrity self-verification function. A user may select the refrigerator 2 and activate the hardware integrity self-verification function of the refrigerator 2.

The external terminal activated with the hardware integrity self-verification function may verify its hardware integrity with the priority through the server 100 when attempting to access another external terminal, and access the external terminal after the verification. The hardware integrity verification result of the corresponding external terminal may be transmitted to the user terminal 1000, and the processor 1200 may be configured to control the display 1500 to update and display the received verification result.

As described above, according to the various example embodiments describe with reference to FIGS. 10 to 11, a user can manage the hardware verification of the plurality of external terminals connected to the user terminal 1000 through the user terminal 1000.

Figure 12:
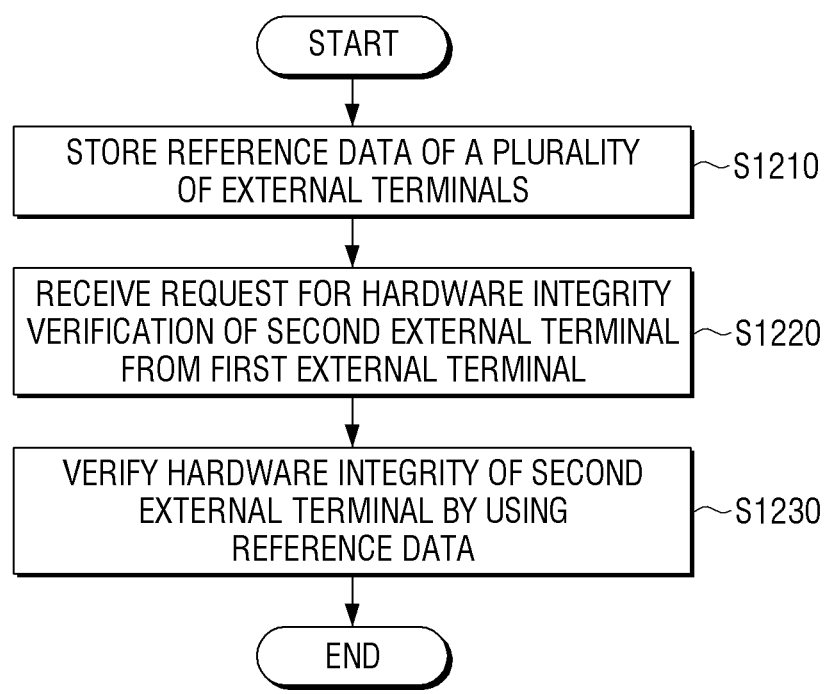
FIG. 12 is a flowchart illustrating an example method for controlling a server.

FIG. 12 is a flowchart illustrating an example method for controlling the server. Referring to FIG. 12, the server 100 may store the reference data for the hardware integrity verification of the plurality of external terminals, at S1210. For example, the server 100 may be provided with the reference data from the plurality of external terminal manufacturers or the reference data from the corresponding external terminal based on the command of a user who registers the reference data at the time the external terminal is initially installed.

The reference data for the hardware integrity verification of the external terminal may, for example, be data for verifying at least one hardware integrity among BIOS, boot loader and firmware stored in ROM, RO areas of RAM, the chip ID, FTL version and OS images of the flash memory, and the start up configuration of NVRAM. Meanwhile, the reference data may be hash data having hash values, although example embodiments are not limited thereto.

When a request for the hardware integrity verification of the second external terminal 300 is received from the first external terminal 200, at S1220, the server 100 may perform the hardware integrity verification of the second external terminal using the stored reference data, at S1230.

For example, when a request for the hardware integrity verification of the second external terminal 300 is received, the server 100 may request the data transmission for the hardware integrity verification to the second external terminal 300. When the memory related data of the second external terminal 300 is received from the second external terminal 300, the server 100 may compare the received memory related data of the second external terminal 300 with the stored reference data of the second external terminal 300, and perform the hardware integrity verification of the second external terminal 300.

The memory related data transmitted by the second external terminal 300 may include, for example, the data of at least one among BIOS, boot loader, and firmware stored in ROM 1310, RO areas of RAM 1320, the chip ID, FTL version and OS images of the flash memory 1340, and the start up configuration of NVRAM 1330. According to an example embodiment, the memory related data may be hash data; however, example embodiments are not limited thereto.

When the received memory related data has at least partial non-matching with the reference data of the second external terminal 300, the server 100 may generate a warning message including the information regarding the non-matching part, and transmit the generated warning message to at least one external terminal among the first 200 and the second external terminal 300.

According to an example embodiment, when a request for the hardware integrity verification of the third external terminal 400 is received from the third external terminal 400 activated with the hardware integrity self-verification function, the server 100 may perform the hardware integrity verification of the third external terminal 400 using the reference data and transmit the verification result to the third external terminal 400.

The server 100 may transmit the verification result to the fourth external terminal 500 when the hardware integrity self-verification function of the third external terminal 400 is activated by the fourth external terminal 500 connected to the third external terminal 400.

The plurality of external terminals described above may make up the IoT environment, although example embodiments are not limited thereto.

Figure 13:
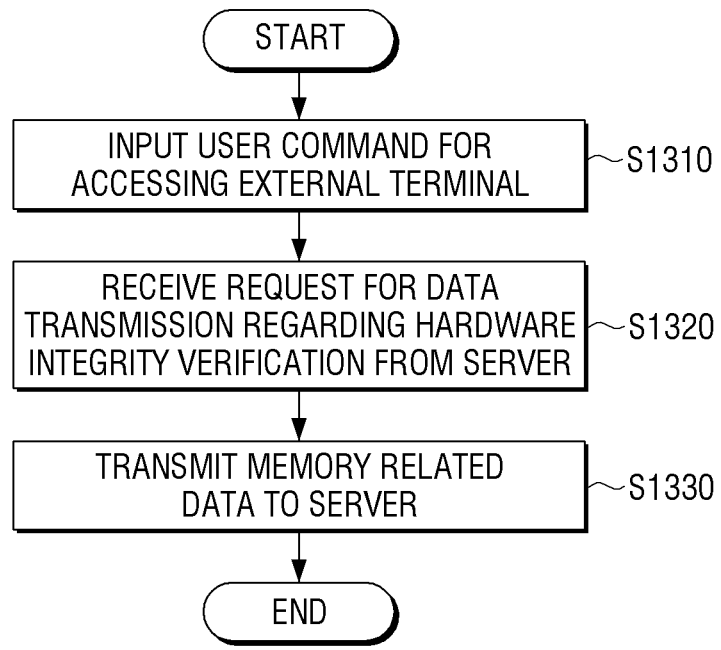
FIG. 13 is a flowchart illustrating an example method for controlling a user terminal.

FIG. 13 is a flowchart illustrating an example method for controlling the user terminal 1000.

Referring to FIG. 13, at S1310, when a user command for accessing the external terminal is input, the user terminal 1000 may receive the request for the transmission of data for the hardware integrity verification from the server 100, at S1320. For example, when the user command for accessing the first external terminal 2000 of the plurality of connected external terminals is input, the user terminal 1000 may request access to the first external terminal 2000. When the second external terminal 2000 requests the hardware integrity verification of the user terminal 1000 to the server 100, the server 100 may request the data transmission for the hardware integrity verification to the user terminal 1000 and the user terminal 1000 may receive the request.

The user terminal 1000 may transmit the memory related data of the memory 1300 included in the user terminal 1000 to the server 100, at S1330. For example, the user terminal 1000 may include at least one memory among ROM 1310, RAM 1320, the flash memory 1340 and NVRAM 1330. When a request for the transmission of data for the hardware integrity verification is received from the server 100, the user terminal 1000 may collect at least one data among BIOS, boot loader and firmware in ROM 1310, RO areas of RAM 1320, the chip ID, FTL version and OS images of the flash memory 1340, and the start up configuration of NVRAM 1330, and transmit the collected data to the server 100. The user terminal may generate hash values of the collected data using hash algorithms, and transmit the generated HASH values as memory related data to the server 100.

When the hardware integrity self-verification function is activated and when a user command for accessing the first external terminal 2000 is input, the user terminal 1000 may transmit the memory related data to the server 100 and request access to the first external terminal 2000 after receiving the hardware integrity verification result of the user terminal 1000.

According to an example embodiment, when the second external terminal 3000 requests access to the user terminal 1000 of the plurality of external terminals, the user terminal 1000 may transmit a request for the hardware integrity verification of the second external terminal 3000 to the server 100. When the hardware integrity verification result of the second external terminal 3000 is received from the server 100, the user terminal 1000 may determine whether to approve the access request of the second external terminal 3000 based on the verification result.

When the verification result that the hardware integrity of the second external terminal 3000 has a problem is received, the user terminal 1000 may reject the access request of the second external terminal 3000, and transmit, to the third external terminal 4000 connected to the user terminal among the plurality of external terminals, a message that the hardware integrity of the second external terminal 3000 has a problem.

According to another example embodiment, the user terminal 1000 may display the plurality of connected external terminals and the hardware integrity verification state respectively regarding the plurality of external terminals. When a command for the hardware integrity verification of at least one external terminal among the plurality of external terminals is input from a user, the user terminal 1000 may transmit, to the server 100, the verification request for the hardware integrity of the external terminal to which the verification command is input. Further, when the hardware integrity verification result of the external terminal to which the verification command is input is received from the server 100, the user terminal 1000 may update the displayed hardware integrity verification state.

According to another example embodiment, the user terminal may distinguish and display the external terminals provided with the hardware integrity self-verification function from the other external terminals among the plurality of external terminals. When a user command for activating the hardware integrity self-verification function of at least one external terminal among the external terminals provided with the self-verification function is input, the user terminal 1000 may transmit a request for activating the hardware integrity verification to the external terminal in which the activating command is input.

The above described user terminal 1000 and the plurality of external terminals may make up an IoT environment, although example embodiments are not limited thereto.

Figure 14:
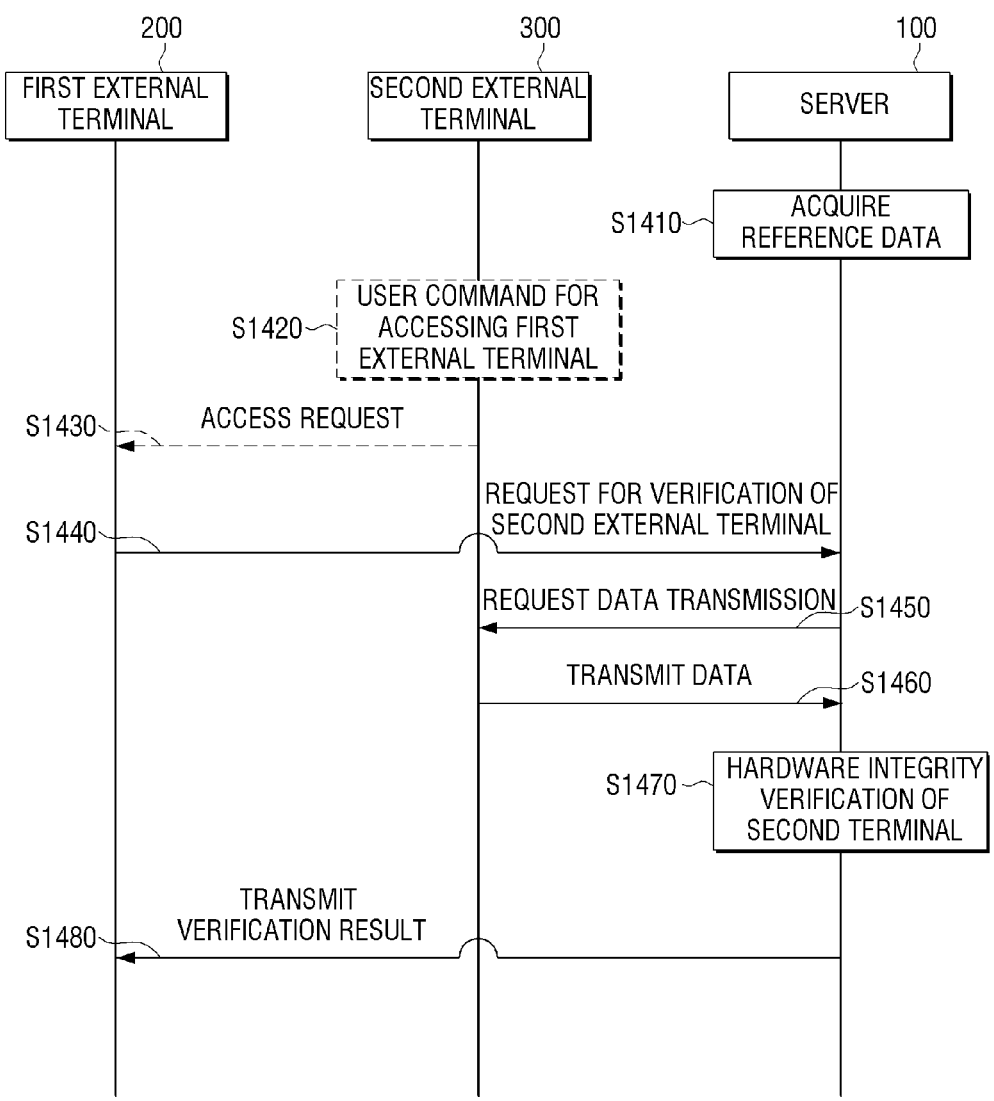

FIG. 14 is a sequence diagram illustrating an example operation of the system for verifying the hardware integrity. The server 100 may be connected to the plurality of external terminals making up the IoT environment through the network, and the first external terminal 200 and the second external terminal 300 may be included in the plurality of above external terminals.

Referring to FIG. 14, at S1410, the server 100 may acquire and store the reference data for the hardware integrity verification of the corresponding external terminal from the manufacturers regarding the plurality of external terminals or the external terminal at the time of installing the external terminal. When a user command for accessing the first external terminal 200 is input by the second external terminal 300 at S1420, the second external terminal 300 may transmit an access request to the first external terminal 200 at S1430. The first external terminal 200 receiving the access request may request the server 100 for the hardware integrity verification of the second external terminal, at S1440.

The server 100 may request the second external terminal 300 for the data transmission for the hardware integrity verification, at S1450. When the second external terminal 300 transmits the data in response to the request at S1460, the server 100 may receive the data and perform the hardware integrity verification of the second external terminal 300 by comparing the received data with the stored reference data, at S1470.

When the server 100 transmits the hardware integrity verification result of the second external terminal 300 to the first external terminal 200 at S1480, the first external terminal 200 may receive the verification result, and determine whether or not to approve the access request of the second external terminal 300 based on the received verification result.

FIG. 15 is a sequence diagram illustrating an example operation of the system for verifying the hardware integrity. As described in FIG. 14, the third external terminal 400, the fourth external terminal 500, and the fifth external terminal 800 in FIG. 15 may be included in the plurality of external terminals making up the IoT environment.

As illustrated in FIG. 15, the hardware integrity self-verification function of the third external terminal 400 may be activated at S1520 based on the activating request at S1510 for the hardware integrity self-verification function of the third external terminal 400 by the fourth external terminal 500.

For example, when the fourth external terminal 500 displays the external terminals provided with the hardware integrity self-verification function among the plurality of external terminals connected to the fourth external terminal 500 and when a user command for activating the hardware integrity self-verification function of the third external terminal 400 is input, the fourth external terminal 500 may request the activating of the hardware integrity self-verification function to the third external terminal 400, and thus, the third external terminal 400 may activate the hardware integrity self-verification function.

In the above example, when a user command for accessing the fifth external terminal 800 is input by the third external terminal 400 at S1530, the third external terminal 400 may not immediately request the access request to the fifth external terminal 800, but instead perform the verification of its own hardware integrity with priority.

For example, the third external terminal 400 may transmit the memory related data of the third external terminal 400 to the server 100 at S1540, and thus, the server 100 may perform the hardware integrity verification of the third external terminal 400 by comparing the stored reference data of the third external terminal with the received memory data at S1550.

The server 100 may transmit the hardware integrity verification result of the third external terminal 400 to the third external terminal 400 and the fourth external terminal 500 at S1560, S1570, and the third external terminal 400 may request access to the fifth external terminal 800 when the hardware integrity of the third external terminal 400 has no problem based on the received verification result, at S1580.

The fourth external terminal 500 receiving the hardware integrity verification result of the third external terminal 400 may update and display the received verification result.

According to the above various example embodiments, the hardware integrity of the terminals may be verified at the network environment that includes a plurality of terminals. Thereby, a more secure network environment can be constructed in defense against hacking of a third party.

Meanwhile, the operation of the processor 120 in the server 100, the controlling method of the server 100, the operation of the processor 1200 in the user terminal 1000, 1000' and the controlling method of the user terminal 1000 according to the above various example embodiments may be implemented in software, and respectively loaded on the server 100 and the user terminal 1000, 1000'.

For example, the server 100 may install non-transitory computer readable recording medium storing a program which, when executed, performs the controlling method of the server which includes storing the reference data for the hardware integrity verification of the plurality of external terminals, receiving a request for the hardware integrity verification of the second external terminal from the first external terminal among the plurality of external terminals, and performing the hardware integrity verification of the second external terminal by using the reference data.

Further, for example, the user terminal 1000, 1000' may install non-transitory computer readable recording medium storing a program which, when executed performs the controlling method of the user terminal which includes receiving a user command for accessing the external terminal, receiving a request for the transmission of data for the hardware integrity verification from the server, and transmitting the memory related data of the memory included in the user terminal to the server in response to the transmission request.

For example the above various applications or programs may be stored and provided in non-transitory computer readable recording medium such as CD, DVD, hard disk, Blu-ray disk, USB, memory card, ROM, and so on. As described above, and will be appreciated by those skilled in the art, the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a rea-only memory and/or a random access memory. Non-transitory storage devices suitable for tangibly embodying computer program instructions and data include all forms of computer memory including, but not limited to, non-volatile memory, including by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium.

The foregoing example embodiments and advantages are merely examples and are not to be construed as limiting the example embodiments. The disclosure can be readily applied to other types of apparatuses. Also, the description of the example embodiments of the disclosure is intended to be illustrative, and not to limit the scope of the claims.

What is claimed is:

1. A server, comprising:
communication circuitry configured to communicate with a plurality of external terminals;
a storage; and
a processor configured to, based on a request for hardware integrity verification of a second external terminal being received from a first external terminal through the communication circuitry, perform hardware integrity verification of the second external terminal using reference data of the second external terminal stored in the storage,
wherein, based on the second external terminal accessing the first external terminal, the server is configured to receive from the first external terminal a transmission of the request for hardware integrity verification of the second external terminal,
wherein, based on the request for the hardware integrity verification being received, the processor is configured to control the communication circuitry to request transmission of data for the hardware integrity verification of the second external terminal to the second external terminal, not via the first external terminal, and
wherein, based on the data for the hardware integrity verification of the second external terminal being received from the second external terminal, not via the first external terminal, the processor is configured to perform the hardware integrity verification of the second external terminal by comparing the received data with the stored reference data.

2. The server of claim 1, wherein
the memory of the plurality of external terminals comprises at least one of ROM, RAM, flash memory and non-volatile RAM(NVRAM), and
the reference data is data for integrity verification of at least one of BIOS, boot loader and firmware stored in the ROM, read only (RO) areas of the RAM, chip ID, flash translation layer (FTL) version and operating system (OS) images in the flash memory, and start up configuration of the non-volatile RAM (NVRAM).

3. The server of claim 1, wherein the stored reference data and the data received from the second external terminal comprise hash data.

4. The server of claim 1, wherein, based on the received data not matching the stored reference data of the second external terminal, the processor is configured to generate a warning message comprising information regarding a non-matching part of the data, and
the processor is configured to control the communication circuitry to transmit the generated warning message to at least one external terminal of the first and the second external terminals.

5. The server of claim 1, wherein the plurality of external terminals comprise an Internet of Things (IoT) environment.

6. The server of claim 1, wherein the reference data is pre-loaded by a manufacturer of the external terminal or provided by the external terminal when the external terminal is installed.

7. The server of claim 1, wherein, when the communication circuitry receives a request for hardware integrity verification of a third external terminal from the third external terminal comprising a hardware integrity self-verification function, the processor is configured to perform the hardware integrity verification of the third external terminal using the reference data and to control the communication circuitry to transmit a verification result to the third external terminal.

8. The server of claim 7, wherein, when the self-verification function of the third external terminal is activated by a fourth external terminal connected to the third external terminal, the processor is configured to control the communication circuitry to transmit the verification result to the fourth external terminal.

9. A user terminal, comprising:
communication circuitry configured to communicate with a server and at least a first external terminal;
a memory configured to store data; and
a processor configured to, based on a request for transmission of data for hardware integrity verification of the user terminal being received from the server, control the communication circuitry to transmit data for hardware integrity verification stored in the memory to the server,
wherein the user terminal is configured to access the first external terminal, and based thereon to receive from the server a request for transmission of the data for hardware integrity verification,
wherein the user terminal is configured to transmit to the server the data for the hardware integrity verification of the user terminal, not via the first external terminal, so that the server can perform hardware integrity verification of the user terminal by comparing the data with reference data of the user terminal.

10. The user terminal of claim 9, wherein the memory comprises at least one of read-only memory (ROM), random-access memory (RAM), a flash memory, or non-volatile RAM (NVRAM), and
the data comprises data about at least one among BIOS, boot loader and firmware stored in ROM, read only (RO) areas of the RAM, chip ID, flash translation layer (FTL) version and operating system (OS) images of a flash memory, and start up configuration of the NVRAM.

11. The user terminal of claim 9, wherein, in response to the request for transmission, the processor is configured to generate hash data of the data, and to control the communication circuitry to transmit the generated hash data.

12. The user terminal of claim 9, wherein, based on a second external terminal accessing the user terminal among the plurality of external terminals, the processor is configured to control the communication circuitry to transmit a request for the hardware integrity verification of the second external terminal to the server, and
based on a hardware integrity verification result of the second external terminal being received from the server, the processor is configured to determine whether to approve the request for accessing of the second external terminal based on the verification result.

13. The user terminal of claim 12, wherein the processor is configured to reject the access request of the second external terminal based on the verification result that the hardware integrity of the second external terminal has a problem being received, and
the processor is configured to control the communication circuitry to transmit a message that the hardware integrity of the second external terminal has a problem, to a third external terminal of the plurality of external terminals.

14. The user terminal of claim 9, further comprising:
a display configured to display the plurality of external terminals, and a hardware integrity verification state of the plurality of external terminals,
wherein, based on an input of a command for the hardware integrity verification of at least one external terminal among the plurality of displayed external terminals being received, the processor is configured to control the communication circuitry to transmit a request for the hardware integrity verification of the external terminal to which the verification command is input to the server, and
based on the hardware integrity verification result of the external terminal to which the verification command is input being received from the server, the processor is configured to control the display to update the verification result to the displayed hardware integrity verification state.

15. The user terminal of claim 9, further comprising:
a display configured to display the external terminals provided with a hardware integrity self-verification function from remaining ones of the plurality of external terminals,
wherein, based on a command for activating the hardware integrity self-verification function of at least one external terminal of the displayed external terminals provided with the self-verification function being received, the processor is configured to control the communication circuitry to transmit a request for activating the self-verification function to the external terminal to which the activating command is input.

16. The user terminal of claim 9, wherein, when the hardware integrity self-verification function of the user terminal is activated and based on a command for accessing the first external terminal is being input, the processor is configured to control the communication circuitry to transmit the data to the server, to receive the hardware integrity verification result of the user terminal, and to request access to the first external terminal.

17. The user terminal of claim 9, wherein the user terminal and the plurality of external terminals are terminals comprising an IoT environment.

18. A non-transitory computer readable recording medium having recorded thereon a program which, when executed, performs a controlling method of a server for hardware integrity verification of a plurality of external terminals constructing the network, wherein the controlling method comprises:
receiving a request for the hardware integrity verification of a second external terminal from a first external terminal among the plurality of external terminals; and
performing the hardware integrity verification of the second external terminal using the reference data of the second external terminal stored in the server,
wherein, based on the second external terminal accessing the first external terminal, the server receives from the first external terminal the request for hardware integrity verification of the second external terminal,
wherein, based on the request for the hardware integrity verification being received by the server, the server requesting transmission of data for the hardware integrity verification of the second external terminal to the second external terminal, not via the first external terminal, and
wherein, based on the data for the hardware integrity verification of the second external terminal being received from the second external terminal, not via the first external terminal, the server performs the hardware integrity verification of the second external terminal by comparing the received data with the stored reference data.

* * * * *